Oct. 22, 1968

W. OVENS 3,406,485

FRAMES AND FRAMEWORK MEMBERS FOR WINDOWS, PARTITIONS AND THE LIKE

Filed Nov. 7, 1966

Inventor
William Ovens
by Sommers & Young
Attorneys

United States Patent Office 3,406,485
Patented Oct. 22, 1968

3,406,485
FRAMES AND FRAMEWORK MEMBERS FOR
WINDOWS, PARTITIONS AND THE LIKE
William Ovens, Glasgow, Scotland, assignor to Bull's
Metal & Marine Limited, Glasgow, Scotland, a corporation of Great Britain
Filed Nov. 7, 1966, Ser. No. 592,415
Claims priority, application Great Britain, Nov. 11, 1965,
47,894/65
2 Claims. (Cl. 49—504)

ABSTRACT OF THE DISCLOSURE

A frame for a window, ventilator, partition, doorway or the like, made up of a plurality of frame members secured to one another to form a frame, each of the frame members being formed from structural bars having a rigid core member of continuous, uniform cross section throughout its length, the bars being clad or sheathed with cladding which encloses the core and comprises two channel shaped sections mounted on either side of the core, and in which the cladding is externally shaped to provide an abutment or abutments for engaging glazing, sealing, supporting, or other parts of the frame.

---

This invention concerns improvements relating to frames for windows, ventilators, partitions, doorways and the like and to framework members or elements for use in or in connection with such frames. An object of the invention is to provide forms of construction which are simple to manufacture and which are applicable in simple practical fashion to suit a wide variety of different requirements with respect to both the nature of the window or other structure and to its finished appearance.

According to the invention, there is provided a frame for a window or like structure comprising a plurality of frame members secured to one another, wherein the main members of the frame comprise structural bars consisting each of a rigid core of uninterrupted or uniform cross-section throughout and of cladding which sheathes said core and comprises two substantially channel section members applied to the core from two opposite sides thereof respectively, at least one of said cladding members having a projecting flange formation for abutment with glazing, sealing, supporting or other means.

With such a structural member, protective and/or decorative cladding of different materials or with different finishes or colours can readily be used for what will be the external cladding and internal cladding when, for example, a window frame comprising such structural members is mounted in the wall of a building. The cladding may be selected, for example, from plastics materials, such as a rigid polyvinyl chloride material, and from metals such as bronze, aluminium and stainless steel which may be shaped by extrusion, rolling or the like. For instance, the outside cladding may be of a metal and the inside cladding of a plastics material. The cladding may be fitted or fixed to the cores in the course of the assembly of the structure in the workshop or on site, even after the cores have been secured to a wall or other adjoining material. Furthermore, the cladding can be readily removed in situ, if required.

The cores will generally be of metal, for example rolled mild steel, and are preferably of a hollow rectangular section. Other cross-sectional shapes may also be employed, for example a triple channel section, i.e., a section comprising a wide middle channel with narrower channels on each side which are of the same depth as, but open in the opposite direction to, the middle channel. Such a section facilitates assembly, the application of the cladding and the accommodation of pivots and other fittings, for example window furniture, required by the structure. It also affords constructional facilities in the production of the structure. Neither the cores nor the cladding need be manufactured to very close tolerances. Relatively simple cross-sectional shapes can be employed and the cladding may be designed simply to be pushed on from the outside and inside. It is unnecessary to provide the cladding with formations for interengagement with additional locking bars or the like.

An embodiment of the invention will now be described by way of example and with reference to the accompanying drawings in which.

Figure 1:
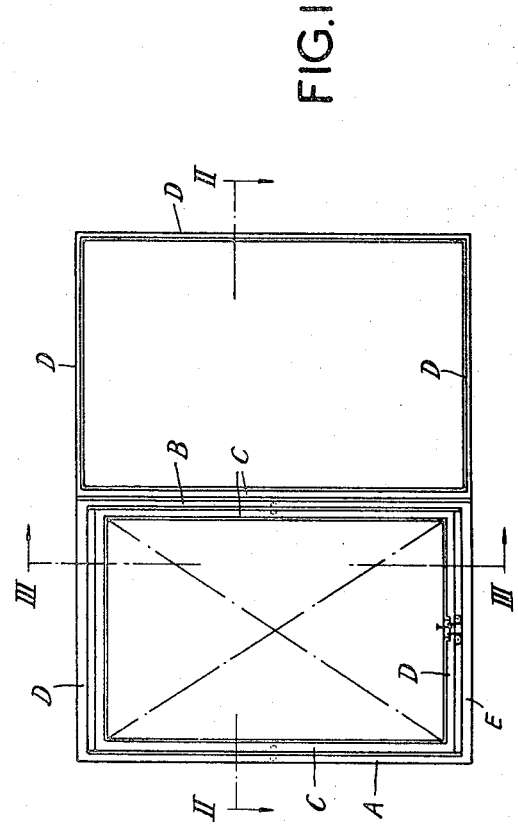
FIGURE 1 is an elevation of a window comprising a fixed pane and an opening pane.

As shown in FIGURE 1, the frame comprises two rectangular frames, the left-hand frame containing the pivoted window, and the right-hand one containing a fixed pane. Commencing at the left-hand side of FIGURE 2, the vertical bar A adjoining the wall of the building comprises a hollow metal core 1 made up of two elongated channel sections arranged to form a hollow rectangular section. This core is suitably drilled to receive the fastening means by which the frame is to be secured to the building. It also has locations which receive one of the pivots for the opening window which in this example is pivoted on a horizontal axis. The core 1 is embraced from opposite sides by two cladding members 2, 3, made of a synthetic plastics material such as polyvinyl chloride. Each member is substantially U-shaped and is a tight fit on the core 1. Cladding member 2 has two lateral flanges 21, 22, one of which, 21, forms part of the connection with the building, and the other of which serves to locate one side of an adjustable sealing or weather strip 24 which is mounted on the core 1 by means of adjusting screws 25. The cladding member 3 has a flange 26 similar in shape and purpose to flange 22. Instead of a second flange corresponding to flange 21, it has a nib 27 projecting from its outer side face, approximately one third of its height from the base.

The other vertical bar of this part of the frame is generally indicated at B, and is formed of a metal core 1, and two identical cladding members 3, having flanges 26 embracing the sealing strip 24 and two nibs 27. The bar B is also provided with a location for the second window pivot means and adjusting means for the sealing strip 24.

The vertical bars of the opening window are generally indicated by the letter C and are identical in construction. Each consists of a hollow metal core 1 and two cladding members. One cladding member, 3 in this example, fitted to what would be the exterior of the window, is identical to the cladding members 3 used on the bars A and B. In this instance, the flange 26 co-operates with a glazing bar to retain the glass G which is retained with the aid of putty or a glazing mastic. The inner cladding member 30 on the bars C has no flanges, but has a nib 27 on each side, one of which serves to locate the glazing bar 28, and the other nib 27 cooperates with the corresponding nib on the cladding member 3 to locate a facing strip F which presents a smooth surface to the flexible seals carried by the sealing strip 24, the strips 24 being adjusted to provide a positive weather seal between the vertical bars of the fixed and moving frames.

Figure 2:
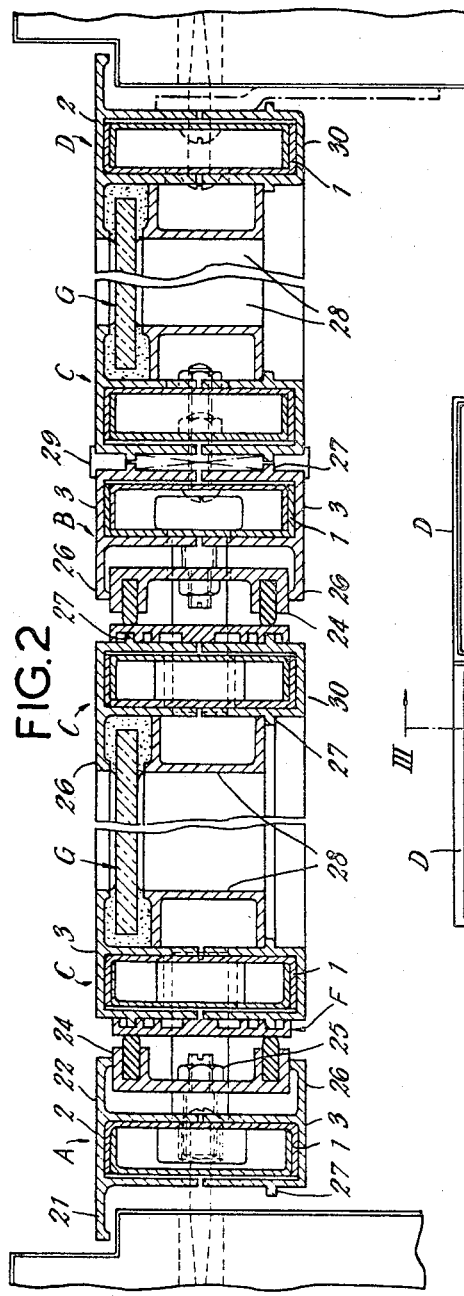
FIGURES 2 and 3 are sections on the lines II—II and III—III respectively of FIGURE 1. Like parts are indicated by like references throughout.

Inside each core 1 is a bearing for the window pivots, and ths form of construction has the particular advantage that the pivots are totally concealed and are fully protected from the effects of weather. The right-hand, fixed part of the frame as shown in FIGURE 2 has two vertical bars, C and D. As implied by its reference, bar C is identical to the vertical bars C of the movable window frame and need not be described in detail. The bar is placed against the bar B with the two pairs of nibs 27 abutting, and the two bars are secured together, for example by bolts and nuts. The inner space between the nibs may be filled by a packing member as shown, and the gap on each side of the double frame member is filled by a strip 29 which serves as a weather seal and may also be utilized to provide decorative effects.

The right-hand vertical bar D consists, like the other bars, of a core 1 and two cladding members. In this instance the outer cladding member 2 corresponds to that on the outside of bar A, while the inner member 30 corresponds to that used on the inner side of the bars C.

In FIGURE 1 the various bars are indicated by their reference letters, and it will be seen how only five separate constructions of bar are needed, the bars being made up of a common core section and cladding members chosen from only three different cross-sections.

Figure 3:
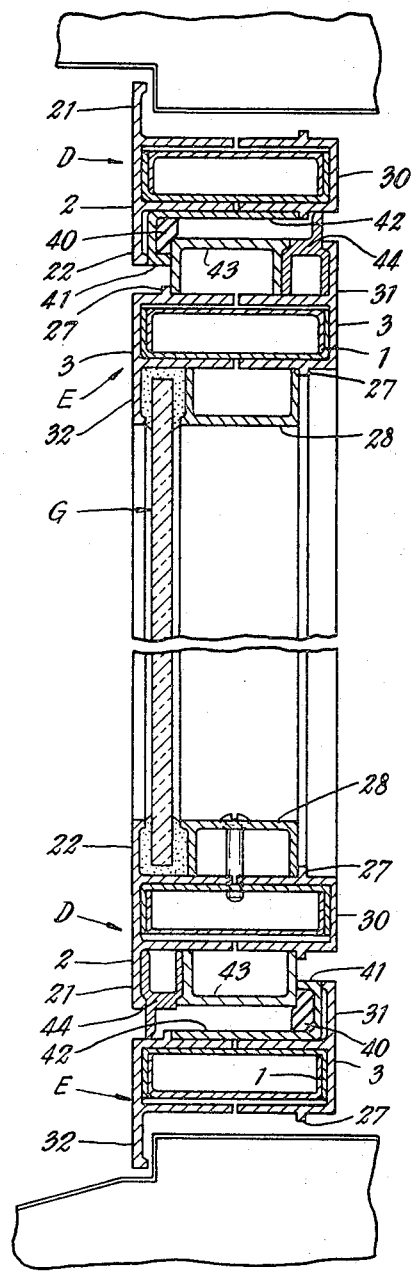

Considering now the vertical section shown in FIGURE 3 like parts are indicated by like references, and it will be noted that only one other form of bar is required to complete the frame of the opening window and its surround.

The topmost bar D adjoins the head of the window and has already been described in connection with FIGURE 2, and it will be noted from FIGURE 1 that this form of bar also forms the upper and lower frame bars of the right-hand pane of the complete window as illustrated. The co-operating upper bar E of the moving window frame consists, like all the other bars, of a core 1 and two cladding members 3. In this instance, however, the cladding members are arranged to provide offset flanges 31, 32. Flange 31 is on the inside of the window as shown, and cooperates with sealing means (described below) on the top bar D, while the flange 32 serves, as in the case of the cars C to retain the glass pane G as previously described.

At the bottom of the opening window, the bar constructions D and E are repeated. However, in this instance the bar E is stationary and adjoins the sill of the window, while lower bar D forms the bottom bar of the moving window frame.

The glazing bars 28 may also be used to support further panes of glass, not shown, for double glazing purposes, in which case, the cladding members 30 on the bars C and D would be replaced by the cladding members of the type indicated at 3 on the opposite sides of the bars.

Composite bars of the kind set forth can be used in connection with either fixed or opening windows, for example horizontal or vertically pivoted windows, and in windows comprising combinations of fixed and opening sections. Even in the case of opening windows, the uninterrupted form of the main members can be maintained. Indeed a single type of composite bar may be common to both fixed and opening windows.

The invention is of particular advantage when applied to a structure comprising a pivoted window or ventilator constructed in the manner set forth in the specification of our British patent application No. 27,988/64, as it offers, in simple fashion facilities for the accommodation of or for cooperation with the pivot members and fittings used in such windows or ventilators, including the adjustable weathering or sealing members, described in the specification. In such windows or ventilators also, the composite member permits of a wide choice of finish on the outside and inside.

The invention can also be used with advantage for large windows, window and/or curtain walling for which it has been usual heretofore to have units or sections incorporating mullions and/or transoms as separate and distinct parts of the construction. Generally the mullions and/or transoms project from the face of the window or the like. They provide the strength required and may also serve as coupling members, in which case they are designed to provide weathering or sealing effects when the window units or sections are coupled together.

A composite member such as has been described above can be used as a mullion or transom or two members can be coupled together to serve as a mullion or transom. In the former case, the transom, say, may be fixed in the upright member by a bolt passed through the latter and screwed into a block accommodated in the middle channel of the transom core and secured therein by a bolt. In the latter case, the two composite members may be secured together, either back to back or otherwise, by means of bolts at intervals. Where two members are so coupled, the flat space formed between them by the abutting nibs may be filled as has been described, for example between the bars B and C in FIGURE 2, by a flat steel bar bedded in a mastic material. Such a bar will afford additional stiffness, which may be required in a large window, and will also assist in effecting definite location of one window unit or section in relation to the other. With such arrangements the joints at mullions and transoms can be completely sealed and concealed.

In no case is it necessary to provide mullions and/or transoms as separate parts to be fitted into a main frame in situ.

As a further protection against the weather and/or as a decorative feature, either or both of the small gaps left between the cladding outside the abutting nibs 27 are filled with strips of sealing and/or decorative material 29, for example a coloured plastics material. These strips may be held in position by adhesive or by the clamping effect produced when the composite members are bolted together. A smooth appearance on the ouside and/or inside can be achieved by such strips. Alternatively, the strips may be designed to project and afford any required decorative effect.

As already stated, the invention is readily applicable to windows which pivot about a horizontal axis as well as to those which pivot about a vertical axis. Among windows of the former kind to which it can be applied are not only those with conventional pivot arrangements, but also those with a so-called projected top hinge. In the case of windows pivotable about a horizontal axis, the seals at the top and bottom edges are supported by composite members such as have been described above. At the lower edge, a sealing strip 40 and stop 41 may be supported by a flange or flanges on a plastics member 42 fitted into the channel formed between the nib 27 and the flange 31 of the two cladding pieces embracing the fixed core of lower member E. The cavity left in the channel may, if desired, be filled with a bar embedded in a mastic material. For co-acting with the sealing strip and stop, the bottom composite member D of the pivotable window has an unequally flanged, downwardly open, channel section member 43 made of a plastics material, whose base is fitted between the nibs 27 of the said bottom member and is bolted to the latter member, the member 43 and the flange 21 supporting a sealing strip 44 between them. A similar but inverted arrangement is provided at the top of the said window.

Conventional methods can be employed for the connections at corners between main composite members. Butt or mitre joints may be made between the cores, but mitre joints are preferably used between the cladding pieces, mastic material being introduced at the inner and outer extremes of the corner.

I claim:

1. A frame for a window-like structure comprising a plurality of frame members secured to one another, wherein the main members of the frame comprise structural bars consisting each of a rigid core of uninterrupted cross-section throughout and of cladding which sheathes said core and comprises two substantially channel section members applied to the core from two opposite sides thereof respectively, at least one of said cladding members having a supporting flange formation for abutment with other parts of said structure, the cladding being provided with longitudinally extending locating and sealing nibs adapted to interfit with adjoining frame members, and at least one of said frame bars being provided with an adjustable member extending parallel thereto and which supports sealing means, said adjustable member being movable towards and away from said frame bar.

2. A frame for a window-like structure comprising a plurality of frame members secured to one another, wherein the main members of the frame comprise structural bars consisting each of a rigid core of uninterrupted cross-section throughout and of cladding which sheathes said core and comprises two substantially channel section members applied to the core from two opposite sides thereof respectively, at least one of said cladding members having a projecting flange formation for abutment with other parts of said structure, at least one of said bars is provided with an adjustable member extending parallel thereto and which supports sealing means, and said adjustable member is movable towards and away from said bar.

References Cited

UNITED STATES PATENTS 2,443,548   6/1948   Wilson _____ 52—217 XR

FOREIGN PATENTS 1,201,062   7/1959   France.

KENNETH DOWNEY, *Primary Examiner.*